/ Patented Dec. 23, 1941

2,267,290

UNITED STATES PATENT OFFICE 2,267,290

STABILIZATION OF BUFFERED FORMALDEHYDE SOLUTIONS

Ian C. Somerville, Philadelphia, Pa., and Harold G. Turley, Moorestown, N. J., assignors to Röhm & Haas Company, Philadelphia, Pa.

No Drawing. Application May 25, 1939,
Serial No. 275,670

2 Claims. (Cl. 149—5)

This invention relates to an improved method for stabilizing formaldehyde solutions. It deals with the prevention of precipitation of polymers of formaldehyde, particularly in buffered formaldehyde solutions which possess a pH above 4.

There are various applications of formaldehyde in which the pH of formaldehyde solutions must be above 4. This condition of pH takes these solutions outside of the pH range of greatest stability, for, as is known, formaldehyde solutions are most stable between pH values of about 2 and about 4. Furthermore, as is known, acidic or basic substances which bring about any appreciable change in pH promote precipitation of polymers from formaldehyde solutions.

This instability of solutions of appreciable formaldehyde content is decidedly troublesome. During storage in the usual unheated warehouse and shipment in cold weather, there forms a sludge or precipitate of polymeric material which interferes with the handling of the solutions and their efficacy in many applications. Satisfactory stabilization of ordinary formaldehyde solutions is accomplished in part with methyl alcohol when the pH is between 2 and 4, but at higher values of pH relatively large quantities of alcohol become necessary and the stability is poor below 0° C. The alcohol has no value other than in providing a moderate degree of stability.

As an example of the difficulties encountered with buffered formaldehyde solutions, there may be cited the solutions made with about 30% formaldehyde solutions and such buffers as sodium acetate, or sodium phosphate and citrate, etc., as used for the tanning of leather. As shown in U. S. Patent 2,129,748, a separate neutralizing operation can be avoided and optimum aldehyde tannage obtained when a buffered formaldehyde solution is added to pickled skins. The buffered solutions used for acid pickled skins must possess a pH of 5 to 7 for optimum effect. In this pH range, however, the formaldehyde solutions are not sufficiently stable for practical handling when they are stored in the cold. With precipitation of polymer, the effective strength of a solution may become so low that proper tannage is not obtained.

It is the object of this invention to provide a method for stabilizing formaldehyde solutions of adjusted pH or of buffer content.

We have found that, if an ammonium compound, such as ammonium acetate, ammonium chloride, ammonium hydroxide, ammonium phosphate or the like, is added to a formaldehyde solution, it effectively prevents precipitation of insoluble polymers over a long period of time. Ammonia and ammonium salts may be used as buffers or they may be added in addition to other buffer salts, such as sodium acetate, citrate, phosphate, etc. Further adjustment of pH may be made by addition of a strong acid, such as hydrochloric, or a strong base, such as sodium hydroxide. It is thus possible to obtain buffered formaldehyde solutions over a wide range of acidity or pH, which are stable up to a pH of about 7.5.

The minimum amount of ammonium compound required for stabilizing formaldehyde solutions will vary with the particular composition of the solution and the concentration of the various materials. The upper limit of ammonium ion concentration is set only by pH limitations and solubility at the temperatures which must be encountered. The amount of ammonium ions sufficient to inhibit the precipitation of formaldehyde polymers is herein termed a "stabilizing amount." From 2% upward of ammonium compound will stabilize solutions containing 15% or more of formaldehyde, although under some conditions smaller amounts may have a noticeable effect in decreasing turbidity of samples stored in the cold even though not preventing precipitation entirely.

In an acetate-chloride buffered 30% formaldehyde solution at pH 5, 3% of ammonium chloride was adequate to give entirely satisfactory protection even on storage near the freezing point for prolonged periods. In a similar solution buffered to pH 6.75, there was slight turbidity on cooling to −20 to −30° C., but the solution was stable above this temperature range. A solution prepared from 96 g. of 30% formaldehyde solution and 40 g. of sodium acetate and hydrochloric acid to bring the pH below 6 was treated with 5.75 g. of ammonium acetate and then found to have a pH of 5. This solution remained clear when cooled to −20 to −30° C. for three hours and for a long period during storage at about 0° C. A solution containing 26% formaldehyde and 30% sodium acetate was treated with 2% of ammonium chloride and 4% of commercial ammonium hydroxide. This solution remained clear on storage in the cold (about 0° C.) over a long period of time. A similar solution treated with 2% ammonium chloride and 2% of ammonium hydroxide remained clear for some months in the cold but finally became faintly turbid. A solution containing 25% formaldehyde and 30% sodium acetate, treated with 2% of ammonium chloride and adjusted with sodium hydroxide to a pH of 7 to 7.2, was stable in cold storage at about 0°–5° C. and developed only a slight turbidity when cooled to −20 to −30° C. for several hours. In all cases controls, free from ammonium ions soon became turbid, gave precipitation of polymers under the same conditions of storage and temperature, and became unacceptable for use.

Buffered formaldehyde solutions containing 15 to about 30% of formaldehyde and 20 to 35% of sodium acetate were found stable on storage when 2 to 6% of an ammonium salt was added, even though the pH of these solutions was relatively high (5 to 7.5). The protective action of the ammonium ion, however, is evident also at lower pH values and also with other buffers than sodium acetate, or in the absence of buffers other than ammonium salts. Ammonium salts may also be used to supplement the protective action of methyl alcohol, which in the usual concentrations, is insufficiently effective in the cold in solutions buffered above pH 4.

The various ammonium compounds or mixtures thereof are effective stabilizers in spite of the relatively large changes in pH which may result upon their addition. This is contrary to the generally accepted fact that compounds which cause appreciable changes in pH promote polymerization. An explanation for the behavior of ammonium compounds is not obvious. It might be supposed that the stabilization depends upon the reversible formation of complexes of formaldehyde and ammonia. If this is so, the complexes are not those with which the chemist is ordinarily familiar for the addition of hexamethylenetetramine to a formaldehyde solution has no preservative action but promotes precipitation. In any case the ammonium groups added are equivalent to only a small fraction of the formaldehyde. The presence of ammonium compounds in no way interferes with the use of buffered formaldehyde solutions. In the tanning of leather there is no indication that the total formaldehyde equivalent to the ammonia is tied up and unavailable, for results with stabilized formaldehyde solutions are equal to freshly prepared formaldehyde solutions free from stabilizer. Results from stored, stabilized solutions are superior to those from stored, unstabilized solutions.

A further advantage of ammonium ion-stabilized formaldehyde solutions is the added buffer effect resulting from the presence of these salts. A stabilizing amount of ammonium salt does not otherwise change the behavior of the solution. Ammonium ions, as preservants, have the further advantage in contrast to other nitrogen compounds in not being precipitants of formaldehyde in buffered solutions, particularly when greater than minimum amounts are used.

We claim:

1. A solution of formaldehyde buffered between about pH 5 and pH 7.5, which contains about 15% to about 30% of formaldehyde, about 20% to about 35% of sodium acetate, and about 2% to about 6% of an ammonium salt.

2. An aqueous solution of formaldehyde buffered between about pH 5 and pH 7.5, which contains from about 15% to about 30% of formaldehyde and from about 20% to about 35% of a buffering salt from the group consisting of acetates, citrates, and phosphates, and about 2% to about 6% of an ammonium ion producing compound.

IAN C. SOMERVILLE.
HAROLD G. TURLEY.